US011996014B2

(12) United States Patent
Francoeur et al.

(10) Patent No.: US 11,996,014 B2
(45) **Date of Patent: *May 28, 2024**

(54) DUAL LABEL COMBINATION

(71) Applicant: Iconex LLC, Duluth, GA (US)

(72) Inventors: Roger Francoeur, Bennington, NE (US); Timothy Darren Livingston, Corryton, TN (US)

(73) Assignee: Iconex LLC, Duluth, GA (US)

( * ) Notice: Subject to any disclaimer, the term of this patent is extended or adjusted under 35 U.S.C. 154(b) by 266 days.

This patent is subject to a terminal disclaimer.

(21) Appl. No.: 17/483,372

(22) Filed: Sep. 23, 2021

(65) Prior Publication Data

US 2022/0013041 A1 Jan. 13, 2022

Related U.S. Application Data

(63) Continuation of application No. 16/203,084, filed on Nov. 28, 2018, now Pat. No. 11,217,120, which is a (Continued)

(51) Int. Cl.

*G09F 3/02* (2006.01)
*B41M 5/52* (2006.01)
*G09F 3/00* (2006.01)

(52) U.S. Cl.

CPC ......... *G09F 3/0288* (2013.01); *B41M 5/5227* (2013.01); *G09F 3/0297* (2013.01); (Continued)

(58) Field of Classification Search

CPC ........... G09F 3/0288; G09F 2003/0201; G09F 2003/0211; G09F 2003/0264; G09F 2003/022; G09F 2003/0205; B41M 5/5227

See application file for complete search history.

(56) References Cited

U.S. PATENT DOCUMENTS

| | | | |
|---|---|---|---|
| 3,539,378 | A | 11/1970 | Shephard et al. |
| 4,839,224 | A | 6/1989 | Chou et al. |

(Continued)

FOREIGN PATENT DOCUMENTS

| | | | |
|---|---|---|---|
| JP | H07-25148 | A | 1/1995 |
| WO | WO-2019144113 | A1 | 7/2019 |
| WO | WO-2020/113117 | A1 | 6/2020 |

OTHER PUBLICATIONS

U.S. Appl. No. 15/876,277 U.S. Pat. No. 11,090,967, filed Jan. 22, 2018, Direct Thermal and Thermal Transfer Label Combination.

(Continued)

*Primary Examiner* — Gerard Higgins

(74) *Attorney, Agent, or Firm* — Schwegman Lundberg & Woessner, P.A.

(57) ABSTRACT

A dual label combination is provided. The label combination includes a label substrate, and the label substrate is die cut with at least three separate labels. The label combination also includes a liner substrate attached to a back side of the label substrate. The label substrate including at least two die cuts with one of the die cuts defining a liner label that corresponds to one of the at least three labels of the label substrate. A back side of the liner substrate includes a coating for imaging on the liner substrate with: inkjet, laser, direct thermal, or thermal transfer printing. The liner label and the corresponding label of the label substrate separable from the label combination by a manufactured pull tab substantially centered at a bottom of the liner label of the liner substrate and the corresponding label of the label substrate.

15 Claims, 5 Drawing Sheets

Related U.S. Application Data continuation-in-part of application No. 15/876,277, filed on Jan. 22, 2018, now Pat. No. 11,090,967.

(52) U.S. Cl.
CPC ..... *B41M 2205/06* (2013.01); *B41M 2205/32* (2013.01); *G09F 2003/0201* (2013.01); *G09F 2003/0205* (2013.01); *G09F 2003/0211* (2013.01); *G09F 2003/022* (2013.01); *G09F 2003/025* (2013.01); *G09F 2003/0264* (2013.01)

(56) References Cited

U.S. PATENT DOCUMENTS

| | | | |
|---|---|---|---|
| 5,242,888 | A | 9/1993 | Atherton et al. |
| 5,248,652 | A | 9/1993 | Talvalkar |
| 5,276,002 | A | 1/1994 | Okumura et al. |
| 5,284,816 | A | 2/1994 | Stephenson |
| 5,449,201 | A | 9/1995 | Miller et al. |
| 5,580,640 | A | 12/1996 | Kraft et al. |
| 5,958,536 | A | 9/1999 | Gelsinger et al. |
| 5,977,227 | A | 11/1999 | Mccreight |
| 6,027,850 | A | 2/2000 | Kawakami et al. |
| 6,254,138 | B1 | 7/2001 | Rawlings et al. |
| 8,043,993 | B2 | 10/2011 | Roth et al. |
| 8,568,847 | B2 | 10/2013 | Brookshire et al. |
| 11,217,120 | B2 | 1/2022 | Francoeur et al. |
| 2004/0195824 | A1 | 10/2004 | Blank |
| 2009/0015649 | A1 | 1/2009 | Keeton et al. |
| 2009/0110865 | A1 | 4/2009 | Mckillip |
| 2012/0234481 | A1 | 9/2012 | Raming |
| 2013/0068380 | A1 | 3/2013 | Brookshire et al. |
| 2016/0086520 | A1 | 3/2016 | Vigunas et al. |
| 2017/0021974 | A1 | 1/2017 | Lemmons et al. |
| 2017/0320333 | A1 | 11/2017 | Benton |
| 2018/0290416 | A1 | 10/2018 | Francoeur et al. |
| 2019/0224986 | A1 | 7/2019 | Francoeur et al. |
| 2019/0228682 | A1 | 7/2019 | Francoeur et al. |
| 2021/0245539 | A1 | 8/2021 | Francoeur et al. |

OTHER PUBLICATIONS

U.S. Appl. No. 17/240,825, filed Apr. 26, 2021, Direct Thermal and Thermal Transfer Label Combination.
U.S. Appl. No. 16/203,084 U.S. Pat. No. 11,217,120, filed Nov. 28, 2018, Dual Label Combination.
"U.S. Appl. No. 15/876,277, Non Final Office Action dated Jan. 10, 2019", 5 pgs.
"U.S. Appl. No. 15/876,277, Response filed Apr. 10, 2019 to Non Final Office Actio dated Jan. 10, 2019", 7 pgs.
"U.S. Appl. No. 16/203,084, Non Final Office Action dated Mar. 18, 2021", 17 pgs.
"U.S. Appl. No. 16/203,084, Notice of Allowance dated Aug. 24, 2021", 10 pgs.
"U.S. Appl. No. 16/203,084, Response filed Jun. 18, 2021 to Non Final Office Action dated Mar. 18, 2021", 11 pgs.
"U.S. Appl. No. 16/203,084, Response filed Dec. 29, 2020 to Restriction Requirement dated Dec. 18, 2020", 7 pgs.
"U.S. Appl. No. 16/203,084, Restriction Requirement dated Dec. 18, 2020", 7 pgs.
"International Application Serial No. PCT/US2019/014530, Invitation to Pay Additional Fees and Partial Search Report dated Apr. 1, 2019", 3 pgs.
"U.S. Appl. No. 15/876,277, Advisory Action dated Mar. 12, 2020", 5 pgs.
"U.S. Appl. No. 15/876,277, Advisory Action dated Nov. 10, 2020", 4 pgs.
"U.S. Appl. No. 15/876,277, Final Office Action dated Jan. 8, 2020", 12 pgs.
"U.S. Appl. No. 15/876,277, Final Office Action dated Sep. 2, 2020", 11 pgs.
"U.S. Appl. No. 15/876,277, Non Final Office Action dated Apr. 29, 2020", 11 pgs.
"U.S. Appl. No. 15/876,277, Non Final Office Action dated Jul. 23, 2019", 12 pgs.
"U.S. Appl. No. 15/876,277, Non Final Office Action dated Dec. 18, 2020", 11 pgs.
"U.S. Appl. No. 15/876,277, Notice of Allowance dated Apr. 14, 2021", 9 pgs.
"U.S. Appl. No. 15/876,277, Response filed Mar. 4, 2020 to Final Office Action dated Jan. 8, 2020", 8 pgs.
"U.S. Appl. No. 15/876,277, Response filed Mar. 17, 2021 to Non Final Office Action dated Dec. 18, 2020", 9 pgs.
"U.S. Appl. No. 15/876,277, Response filed Mar. 31, 2020 to Advisory Action dated Mar. 12, 2020", 4 pgs.
"U.S. Appl. No. 15/876,277, Response filed Jul. 29, 2020 to Non Final Office Action dated Apr. 29, 2020", 8 pgs.
"U.S. Appl. No. 15/876,277, Response filed Oct. 23, 2019 to Non-Final Office Action dated Jul. 23, 2019", 9 pgs.
"U.S. Appl. No. 15/876,277, Response filed Nov. 2, 2020 to Final Office Action dated Sep. 2, 2020", 8 pgs.
"U.S. Appl. No. 17/240,825, Preliminary Amendment filed Apr. 30, 2021", 6 pgs.
"European Application Serial No. 19741054.1, Extended European Search Report dated Mar. 5, 2021", 9 pgs.
"International Application Serial No. PCT/US2019/014530, International Preliminary Report on Patentability dated Aug. 6, 2020", 13 pgs.
"International Application Serial No. PCT/US2019/014530, International Search Report dated Jun. 10, 2019", 6 pgs.
"International Application Serial No. PCT/US2019/014530, Written Opinion dated Jun. 10, 2019", 11 pgs.
"International Application Serial No. PCT/US2019/063771, International Preliminary Report on Patentability dated Jun. 10, 2021", 7 pgs.
"International Application Serial No. PCT/US2019/063771, International Search Report dated Jan. 24, 2020", 2 pgs.
"International Application Serial No. PCT/US2019/063771, Written Opinion dated Jan. 24, 2020", 5 pgs.
"European Application Serial No. 19889855.3, Extended European Search Report dated Apr. 29, 2022", 12 pgs.

FIG. 3A
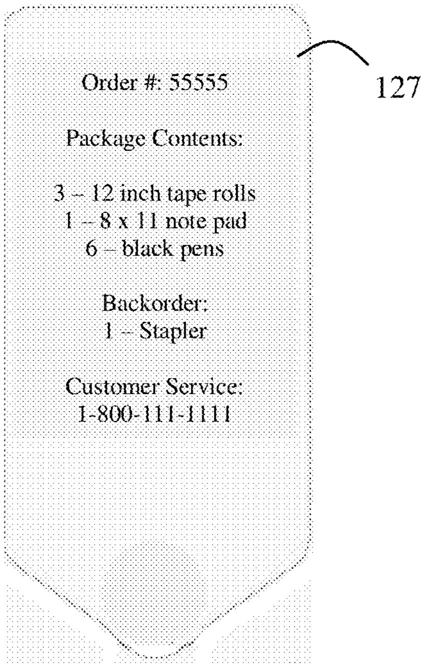
FIG. 3B
FIG. 3

DUAL LABEL COMBINATION

RELATED APPLICATIONS

The present application is a Continuation of U.S. application Ser. No. 16/203,084 entitled: "Dual Label Combination," filed on Nov. 28, 2018, which is a Continuation-In Part of co-pending U.S. application Ser. No. 15/876,277 entitled: "Direct Thermal and Thermal Transfer Label Combination," filed on Jan. 22, 2018, the disclosure of which is incorporated herein in its entirety.

BACKGROUND

The ubiquitous label is available in a myriad of configurations for use in various applications, including specialty applications. A label can be imaged on a single side or both sides using inkjet printers, laser printers, and/or thermal printers.

Direct thermal imaging occurs when a thermal print head of a thermal printer applies heat to the surface of the label to selectively activate thermal ink coated on the surface of the label.

Thermal transfer imaging occurs when a thermal ribbon of a thermal printer transfers/melts ink onto the surface of the label for selectively imaging the label.

Labels can be linerless, which means that there is a single substrate upon which the label is affixed and imaged. Moreover, labels can may also include liners, which means a labels is affixed to a second substrate and separated from the liner by peeling the label off the liner.

Typically, labels associated with liners do not image the liner; rather, if a label is dual imaged, at least the side of the label that is adhered to the liner is imaged before the label is affixed to the liner.

SUMMARY

In various embodiments, a dual (double-sided) label combination, and method of producing the same are provided.

According to an embodiment, a label combination is provided. The label combination includes: a label substrate that includes at least three independent labels; a liner substrate attached to a back side of the label substrate along a front side of the liner substrate, wherein the liner substrate includes a liner label; and a pull tab substantially centered at a bottom of the label and liner substrates and the liner label and a corresponding label of the at least three independent labels, wherein the pull tab is configured to allow separation of the liner label and the corresponding label from the label combination.

In an embodiment, the liner substrate includes a specialized coating applied to a back side of at least the liner label that transforms the liner substrate into a substrate that can be imaged by one or more of: inkjet printing, laser printing, direct thermal printing, and thermal transfer printing.

BRIEF DESCRIPTION OF THE DRAWINGS

FIG. 3A is an example first substrate imaged with first indicia for a dual-imaged label combination, according to an example embodiment.

FIG. 3B is an example second substrate imaged with second indicia for a dual-imaged label combination, according to an example embodiment.

DETAILED DESCRIPTION

As will be described more completely herein and below, a dual label combination is presented. The label combination includes a first substrate capable of being imaged on a front side of that substrate and a second substrate capable of being imaged on a back side of that substrate.

The imaging technique used for imaging the front side of the first substrate can be the same as or different from the imaging technique used for imaging the back side of the second substrate.

In an embodiment, the imaging technique on the front side of the first substrate and the back side of the second substrate is one of: direct thermal, thermal transfer (discussed with the FIG. 3 below), inkjet, and laser.

When the imaging technique is inkjet or laser, the two substrates do not have to include any thermal-based coating but the liner substrate may include a specialized coating to transform the liner substrate (one of the two substrates) into a print-receptive media by making the liner substrate more opaque and conducive to being imaged by inkjet or laser printing.

In an embodiment, no specialized coating is applied to either of the substrates beyond what was premanufactured for the two substrates.

The term "channel" is a die cut portion of a substrate defined by a weakened periphery that outlines the portion (perforation) within the substrate. A "die cut" may be used herein synonymously with the term "perforation." Both of the two substrates, discussed herein and below, include a variety of manufactured die cuts or perforations in the configurations discussed in the embodiments.

Figure 1A:
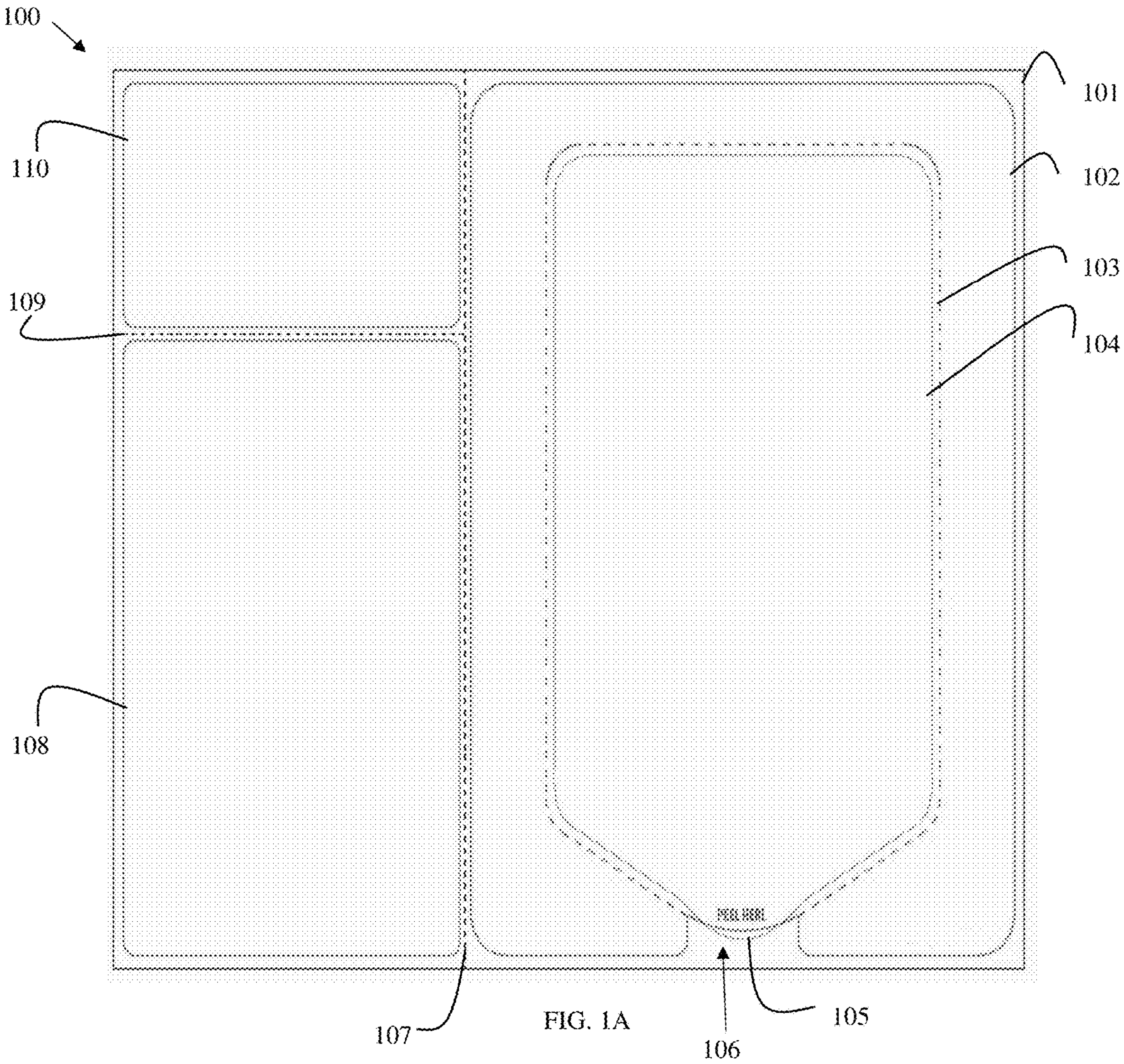
FIG. 1A is a diagram of a first substrate configuration for a dual label combination, according to an example embodiment.

FIG. 1A is a diagram of a first substrate 100 configuration for a dual label combination, according to an example embodiment. It is noted that the dimensions of the substrate 100 and the liner/film 120 (discussed in the FIG. 1B) can vary in various embodiments presented herein and below.

Figure 1B:
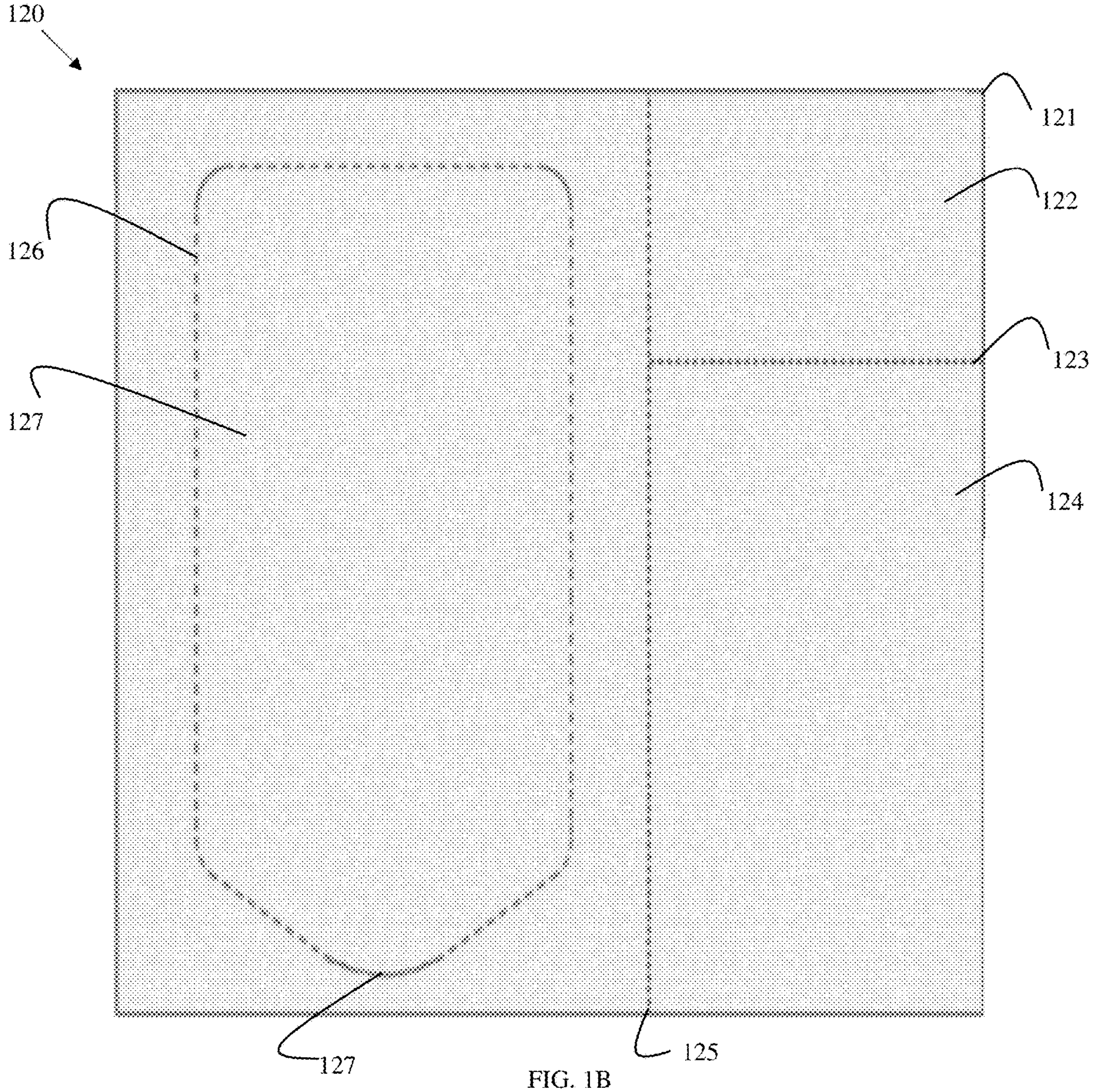
FIG. 1B is a diagram of a second substrate configuration for a dual label combination, according to an example embodiment.

The dual label combination includes the first substrate 100 and a second substrate 120 (FIG. 1B). The two substrates (100 and 120) are adhered together with adhesive and capable of being separated through a release coating. That is, the back side of the first substrate 100 includes an adhesive coating and a front side of the second substrate 120 includes a release coating.

In an embodiment, the entire back side of the first substrate 100 includes a uniformly applied adhesive coating and the entire front side of the second substrate includes a uniformly applied release coating.

The first substrate 100 (referred to hereinafter as "label substrate 100") includes a substrate (face stock, etc.). The label substrate 100 includes a front side 101.

In an embodiment, the front side 101 includes a direct thermal coating activated by a direct thermal print head that applies heat to the coating to selectively image (reveal custom indicia) the front side 101.

In an embodiment, the front side 101 includes a thermal transfer coating that permits a thermal ribbon to be applied against the front side 101 to transfer ink onto the front side 101 and thereby selectively image the front side 101.

In an embodiment, the front side 101 does not include any thermal coating and the front side 101 is imaged by a dot matrix inkjet printer and/or a laser inkjet printer.

The front side 101 includes a plurality of manufactured perforations (die cuts) 103, 107, and 109. Each perforation (103, 107, and 109) arranged on the front side 101 to define three-separate and independent labels 102 (including inner label 104), 108, and 110.

The largest depicted label 102 includes an enclosed perforated inner label 104. The inner perforated label 104 includes an indented pull tab 105 and a space 106 that is devoid of any label substrate material. The label substrate 100 has less area than the second substrate 120 (hereinafter referred to as "liner substrate 120").

This area 106 in combination with the perforated tab 105 (which is also perforated through the liner substrate 120 through perforation 126) allows a user to grab the tab 105 and pull up to separate the inner perforated label 104 from the label 102 (which remains affixed to the liner substrate 120—the remaining portion of 102 representing a border area for inner label 104). Because a corresponding perforation 126 (from the FIG. 2) is made in the liner substrate 120, when the user separates label 104 from the label combination, the user has portions from both the label substrate 100 (label 104) and the liner substrate 120 (label 127).

So, there is no additional material from either substrate 100 and 120 that is necessary to remove and throw away when the labels 104 and 127 are removed from the label combination, and there is no additional user actions required before gaining access to the label 127 (situated directly behind label 104), as is conventionally the approach with tear strips, or border removal approaches.

The label 104 is imaged on the front side 101 and the label 127 is imaged on the backside 121 of the liner substrate 120. Again, the approach taken to image the front side 101 of the label substrate 100 and the backside 121 of the liner substrate 120 can include the same or different imaging techniques (direct thermal, thermal transfer, dot matrix, laser inkjet, etc.). However, depending on the application, for thermal-based printing, the front side 101 of the label substrate 100 and the back side of the liner substrate 120 may need the appropriate thermal coating layer (direct thermal coating and/or thermal transfer coating).

In an embodiment, the dual label combination also includes two additional and separate labels 108 and 110, these can be removed through perforations 107 and 109. The imaging used to provide indicia for these labels 108 and 110 corresponds to the type of thermal coating, if any, applied on the front side 101.

In an embodiment, the label 104 is imaged with indicia representing an address label (as shown in the FIG. 3A).

In an embodiment, at least one of the labels 108 and 110 is imaged with indicia representing a return address label.

In an embodiment, at least one of the labels 108 and 110 is imaged with indicia representing: a coupon or promotion-based material, instructions for assembly, instructions for operating, and other types of indicia desired by a retailer.

In an embodiment, the back side 121 of the label substrate 120 is imaged with indicia representing a packing slip for contents of a package to which the label 102 and 104 are affixed.

The dual label combination is processed through a printer to achieve dual-sided imaging with all the desired indicia of the retailer provided in labels 102, 104, 108, and 110 on the front side 101 of the label substrate 100 and the desired indicia of the retailer provided in label 127 on the back side of the liner substrate 120. The coatings or lack thereof on the front side 101 of label substrate 100 and the back side 121 of the liner substrate 120 determines what type of printer is used to image the labels 102, 104, 108, 110, and 127.

The printer can provide dual print heads to achieve the dual imaging on a single pass of the dual label combination through the printer. Alternatively, the printer can use a single print head that flips (changes the orientation of) the dual label combination after the front side 101 of the label substrate 100 is imaged and uses a second pass by the single print head to image the back side 121 of the liner substrate 120.

In an embodiment, the dimensions of the dual label combination is as follows: approximately 8.5 inches by 11 inches; label 108 is die cut with approximately dimensions of 4.0625 inches by 2.3125 inches; label 110 is die cut with approximately dimensions 4.0625 inches by 5.8125 inches; label 102 and 104 includes approximately dimensions of 6.5625 inches by 8.2477 inches; label 104 is die cut within label 102 with approximately dimensions of 4.7492 inches by 7.4475 inches; back cut dimensions are approximately 4.5573 inches by 7.425 inches; and the internal perforations are approximately 8 CPI by 0.015 inch tie.

It is noted that the above embodiment is presented for one embodiment and that are dimensions are possible for the die cuts and the substrates 100 (label substrate) and 120 (liner substrate).

FIG. 1B is a diagram of the back side 121 of the liner substrate 120. The back side 121 includes perforations 123, 125, and 127 for areas 122 and 124 that correspond to labels 110 and 108, respectively. The label 127 is defined by perforation 127 and corresponds to label 104.

In an embodiment, perforation 123 does not exist and is unnecessary in the liner substrate 120.

In an embodiment, the areas 122 and 124 are not imaged.

In an embodiment, one or more areas 122 and 124 are imaged, such as when there was not enough space for indicia needed in labels 110 and 108, respectively. In this embodiment, the space within areas 122 and 124 may be viewed as continuation of indicia provided in labels 110 and 108, respectively.

In an embodiment, the liner substrate 120 is a film or translucent-based material and becomes opaque when a thermal-based coating is applied to the back side 121 of the liner substrate 120.

In an embodiment, the entire back side 121 of the liner substrate 120 is uniformly coated with an adhesive and a portion of back side 121 represented by label 127 includes a release coating.

In an embodiment, the area to the left of perforation 125 on the back side 121 includes an adhesive coating and the portion of the back side 121 represented by label 127 includes a release coating.

In an embodiment, the area to the right of perforation 125 on the back side 121 is devoid of any adhesive coating.

In an embodiment, the area to the left of perforation 125 excluding the area representing label 127 on the back side 121 is coated with adhesive.

In an embodiment, an adhesive is applied as patches on the back side 121, wherein the patches are applied selectively in areas that do not include the label 127 and do not include the area to the right of perforation 125.

In an embodiment, the front side 101 of the label substrate 100 is coated with a direct thermal or thermal transfer coating and the back side 121 of the liner substrate 120 is coated with a same or different thermal coating from that which was coated on the front side 101 of the label substrate 100.

In an embodiment, neither the front side 101 of the label substrate 100 nor the back side 121 of the liner substrate include any thermal coating.

A sample application of the dual label combination is as follows. A retailer utilizing software for order and fulfillment receives an order for goods and processed the software to image the dual label combination with customized indicia for the order. The software interacts with a print driver for the printer and the dual label combination is fed through the printer (manually or from an infeed basket of the printer).

The printer can be an: inject printer, laser printer, a printer with dual direct thermal print heads, a printer dual thermal transfer print heads, or a printer with one direct thermal print head and one thermal transfer print head. In an embodiment, the printer can be incapable of duplex (two-sided printing), such that the printer has just one print head. In such cases, either printer permits automatic flipping the orientation of the dual label combination to process the first side 101 and the back side 121 within the housing of the printer, or once the first side 101 is imaged with indicia by the software for the order, the dual label combination is manually fed back through the printer in an opposite orientation to image the back side 121 with different indicia.

As noted above, depending upon the print head type(s) of the printer used, the coatings on the front side 101 and the back side 121 will vary. No special coatings are necessary if the print head type(s) are inkjet or laser-based.

The printer may also activate adhesive coating on the back side 121 of the dual label combination.

While being imaged by the printer, the label 104 is imaged with indicia representing an address label for an address of a customer that placed the order. The label 110 is imaged with indicia representing a return address label for the retailer's return processing center. The label 108 is imaged with indicia representing a discount or coupon on a next order made by the customer. While being imaged by the printer, the label 127 is imaged with indicia represent the contents of the order.

The imaged dual label combination is then torn along perforation 107 to separate labels 108 and 110 from labels 102 (border portion of 104) and 104. The labels 108 and 110 may or may not be further separated from one another along perforation 109 (if not further separated, the customer can do this after receiving the packaged order to which the dual label combination is associated). The labels 108 and 110 (either a single piece of two separate pieces) are then placed inside the package associated with the order. The labels 102 and 104 are placed on the outside surface of the package as a mailing label once the package is sealed for delivery with the goods associated with the order.

The package is delivered and upon receipt by the customer, the customer grasps tab 105 and pulls up. This results in the customer separating label 104 of the label substrate 100 and label 127 of the liner substrate 120 from label 102 of the label substrate as one unit that includes the label 102 and 127. The label 102 of the label substrate 100 and the corresponding remaining liner substrate portions of the liner substrate 120 remain affixed (adhered) to the surface of the package. The customer then grasps the tab portion of the tab 105 and the underlying liner substrate 120 in the area of the tab 105 and pulls to separate the two substrates 100 and 120 as two independent labels 104 and 127. The backside 121 of the liner substrate 120 (label 127) includes the imaged indicia representing the package (order contents). It is noted that the labels 104 and 127 do not have to be separated and can remain adhered together (such that there was no release coating on the front side of the liner substrate 120); in such embodiments, the customer may simply flip the combined label 104 and 127 to inspect the packing contents (packing list) imaged on the label 127. The customer also detects inside the package labels 108 and 110. Label 110 may be placed back on the same package or a different package as a return address mail label in the event the customer desires to return one or more of the goods received in the package back to the retailer. Label 108 may include a valuable discount, promotion, or offer that the customer can retain for future use. Alternative, label 108 may be imaged with indicia representing a return policy of the retailer, handling instructions for the goods of the order, assembly instructions for one or more of the goods, and the like.

Figure 2:
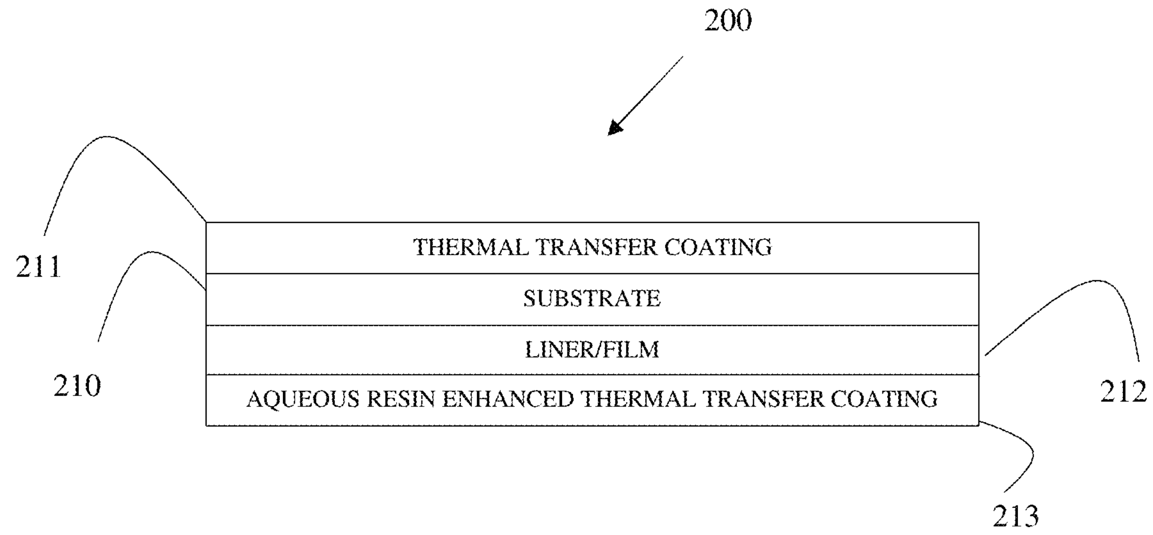
FIG. 2 is a diagram of an example dual thermal transfer label combination, according to an example embodiment.

FIG. 2 is a diagram of an example dual thermal transfer label combination 200, according to an example embodiment.

The combined label combination 200 includes a label substrate 210 (corresponding to label substrate 100) and a liner substrate 212 (corresponding to liner substrate 120). The front side 101 of the combined label combination 200 includes a thermal transfer coating 211. In an embodiment, the back side of the label substrate 210 includes a uniform adhesive coating. In an embodiment, the back side of the label substrate 210 includes a uniform release coating. In an embodiment, the backside of the label substrate 210 includes no adhesive and no release coatings.

The liner/film substrate 212 includes an aqueous resin enhanced thermal transfer coating 213 on the back side 121. In an embodiment, the front side of the liner substrate 212 includes a uniform release coating. In an embodiment, the front side of the liner substrate 212 includes a uniform adhesive coating. In an embodiment, the front side of the liner substrate 212 includes no release and no adhesive coatings.

In an embodiment, the thermal transfer coating 211 is prefabricated on the label substrate 210 whereas the aqueous resin-based thermal transfer coating 213 is post-manufactured onto the back side 121 of the liner substrate 212 by applying the coating 213 to the back side 121.

In an embodiment, the substrate 210 and the thermal print coating 211 is a pharmaceutical grade thermal print stock.

The liner 212 is a translucent and soft material until the aqueous resin-based thermal transfer coating 213 is applied at which point the liner 212 becomes more opaque and harder and conducive for thermal transfer printing by a thermal transfer print head (ribbon).

In an embodiment, the aqueous resin-based thermal transfer coating 213 includes a resin dissolved in an alkaline solution so as to raise the alkalinity of the aqueous resin-based thermal transfer coating 213 above a pH of 7.0. In an embodiment, the alkaline solution is ammonia. In an embodiment, the aqueous resin-based thermal transfer coating 213 includes a pH that is equal to or greater than a pH associated with ammonia.

In an embodiment, the aqueous resin-based thermal transfer coating 213 includes a low wax content. That is, the wax content of the aqueous resin-based thermal transfer coating 213 is less than what would be found in existing thermal transfer coatings.

In an embodiment, the aqueous resin-based thermal transfer coating 213 is specialized or customized for performance to a thermal transfer ribbon of a thermal printer.

When the aqueous resin-based thermal transfer coating 213 is applied to the back side 121 of the liner 212, the liner 212 is calendared, smoothed, and hardened, such that the liner 212 is capable of being printed on by a thermal transfer ribbon of a thermal printer (the ribbon bites onto the surface of second side of the liner 212 for quality thermal transfer printing). That is, prior to the coating 213 being applied to the liner 212 is incapable of being imaged by a thermal transfer technique without significant smearing and/or smudging. After, the coating 213 is applied to the liner 212, the liner 212 becomes thermal-transfer capable and can be imaged with substantially less or without any smearing or smudging.

In an embodiment, prior to coating 213 the second side of the liner 212, the liner 212 was incapable of having barcodes or Quick Response (QR) imaged with a quality that could be read from a scanner (particularly by lower quality scanners). However, after the coating 213 is applied to the back side 121 of the liner 212, barcodes and QR codes can be imaged on the liner 212 and read by scanners without any problems.

The aqueous resin-based thermal transfer coating 213 provides image quality on the liner 212 as a back side 121 of the dual label combination 200 with both the front side 101 of the label substrate 210 including a thermal transfer coating 211 and the back side 121 of the liner substrate 212 a specialized thermal transfer coating 213 (as discussed in the various embodiments above). This permits dual sided thermal transfer imaging on the label combination 200.

FIG. 3A is an example label substrate 100 imaged with first indicia for a dual-imaged label combination, according to an example embodiment. The customized indicia is imaged on the front side 101 of the label substrate 100 and represented as label 104. The label 104 shows indicia that includes an encoded QR code and a bar code that may be used by the sender of a package and/or a delivery agent or mail carrier of the package.

FIG. 3B is an example liner substrate 120 imaged with second indicia for a dual-imaged label combination, according to an example embodiment. The indicia represents an example packing list and order information for an order and is imaged on the back side 121 of the label substrate 120 as label 127.

It is to be noted that although the label substrate 120 may be translucent after coating the back side 121 of the labels substrate 120, the back side 121 of the label substrate 120 becomes opaque and is receptive to high quality printing, such that QR and bar codes may also be imaged on label 127 (although not depicted in the FIG. 3B, this was discussed above with the description of the FIG. 2).

Figure 4:
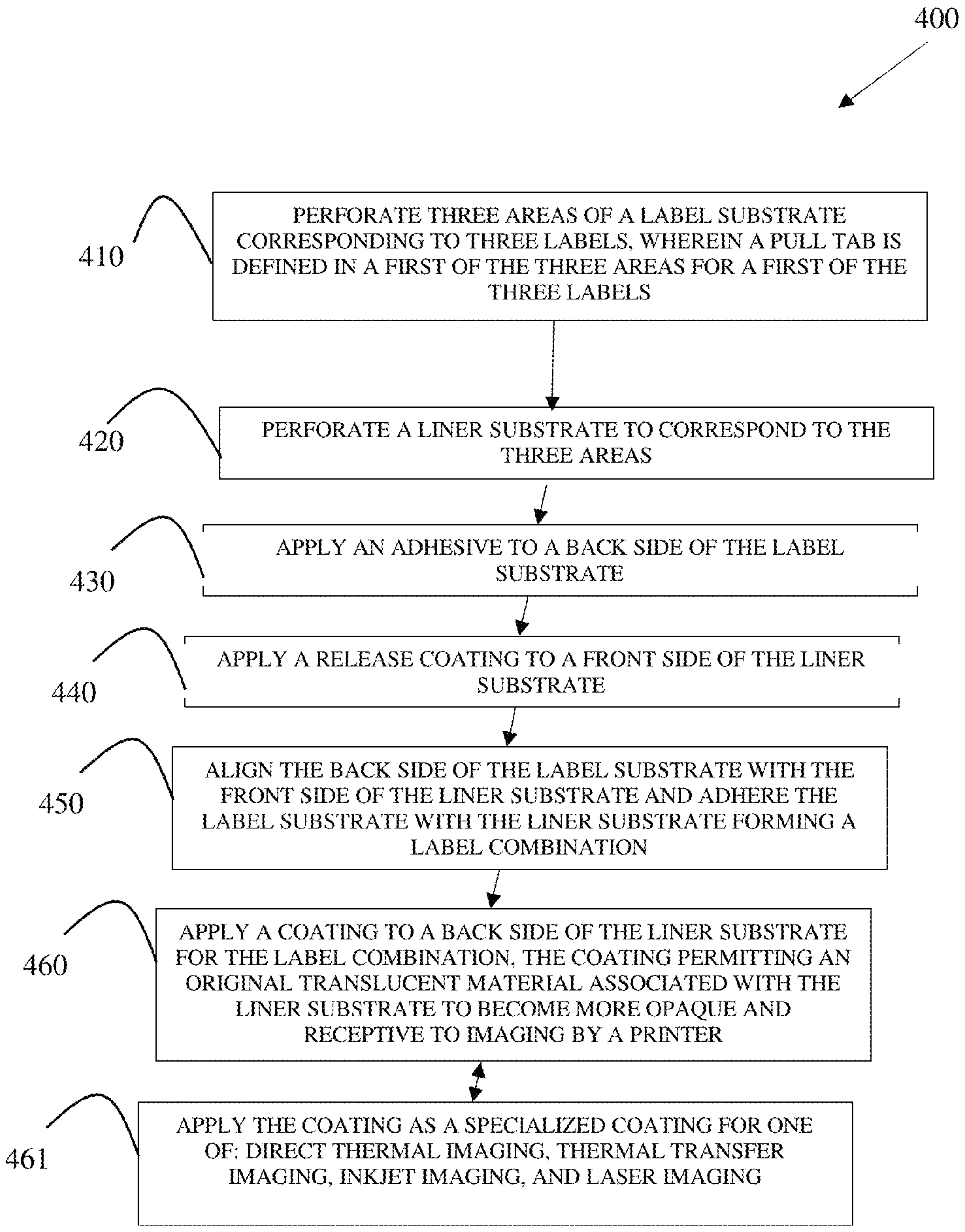
FIG. 4 is a diagram of a method for producing a dual label combination, according to an example embodiment.

FIG. 4 is a diagram of a method 400 for producing a dual-imaged label combination, according to an example embodiment The method 400 is implemented on a press and is processed by a press configured to perform the processing depicted. That is executable instructions that are executed by a hardware processor from a non-transitory computer-readable storage medium drive electromechanical components of the press to perform the method 400 for purposes of manufacturing the label combination discussed herein and above.

At 410, a label substrate 100 is perforated to define three separate labels. A pull tab 105 is defined in a first of the three areas for a first 104 of the three labels (104, 108, and 110).

At 420, liner substrate 120 is perforated to correspond to the three areas of 410.

At 430, an adhesive is applied to a back side of the label substrate 100.

At 440, a release coating is applied to a front side of the liner substrate 120.

At 450, the back side of label substrate 100 is aligned with the front side of the liner substrate 120. The label substrate 100 and the liner substrate 120 are adhered (pressed) together forming a label combination.

At 460, a coating is applied to a back side 121 of the liner substrate 120 for the label combination. The coating permits an original translucent material associated with the liner substrate 120 to become more opaque and receptive to imaging by a printer.

In an embodiment, at 461, the coating is applied as a specialized coating for one of: direct thermal imaging, thermal transfer imaging, inkjet imaging, and laser imaging.

Although the present invention has been described with particular reference to certain preferred embodiments thereof, variations and modifications of the present invention can be effected within the spirit and scope of the following claims.

The invention claimed is:

1. A label combination, comprising:
- a label substrate comprising at least three independent labels including a first label;
- a liner substrate comprising a liner label; and
- a tab substantially centered at a bottom of the first label and configured to separate the first label from the label substrate with the liner label separated from the liner substrate, wherein the tab is defined via a perforation through the liner substrate;
- wherein the first label of the label substrate is aligned and adhered to the liner label of the liner substrate.

2. The label combination of claim 1, wherein the first label is defined by a first die cut within the label substrate and the liner label is defined by a second die cut within the liner substrate.

3. The label combination of claim 2, wherein the first die cut, and the second die cut are aligned ensuring that when the tab is pulled both a die cut portion of the first label and a second die cut portion of the liner label are removed together as a label combination.

4. The label combination of claim 1 further comprising, a thermal transfer receptive coating on a front side of the label substrate.

5. The label combination of claim 4 further comprising, an aqueous resin-based thermal transfer receptive coating on a backside of the liner substrate.

6. The label combination of claim 1 further comprising, a weakened periphery through both the label substrate and the liner substrate that outlines both the first label within the label substrate and the liner label in the liner substrate.

7. The label combination of claim 1 further comprising, an adhesive coating on a backside of the label substrate and a release coating on a front side of the liner substrate.

8. The label combination of claim 7, wherein a front side of the label substrate comprises a direct thermal coating.

9. The label combination of claim 1, wherein the label substrate has less area than the liner substrate, and wherein a space adjacent to the tab is devoid of any label substrate material.

10. A label combination, comprising:
- a label substrate comprising a thermal transfer receptive coating on a front side and an adhesive on a backside of the label substrate;
- a liner substrate comprising a release coating on a front side the liner substrate and an aqueous resin-based thermal transfer receptive coating on backside of the liner substrate;

at least three independent labels including a first label defined within the label substrate that aligns with a liner label defined within the liner substrate; and a pull tab along the label substrate and the liner substrate substantially centered at a bottom of the first label and a bottom of the liner label, wherein the pull tab is defined via a perforation through the liner substrate.

11. The label combination of claim 10, wherein a space adjacent to the pull tab is devoid of any label substrate material.

12. The label combination of claim 10, wherein when the pull tab is pulled up the first label and the liner label are separated from remaining portions of the label substrate.

13. A label combination, comprising:

a first substrate comprising at least three independent labels including a first label;

a second substrate including a liner label; and a tab substantially centered at a bottom of the first label and a bottom of the liner label, wherein the tab is defined via a perforation through the liner label;

wherein the first substrate is affixed to the second substrate with the first label aligned over top of the liner label.

14. The label combination of claim 13, wherein a front side of the first substrate comprises a direct thermal coating for direct thermal printing on the front side of the first substrate.

15. The label combination of claim 14, wherein a backside of the second substrate comprises a thermal transfer receptive coating for thermal transfer printing on the backside of the second substrate.

* * * * *